Inventors
Aquila D. Mast,
Leslie Furlow,
By Lester L. Sargent
Attorney

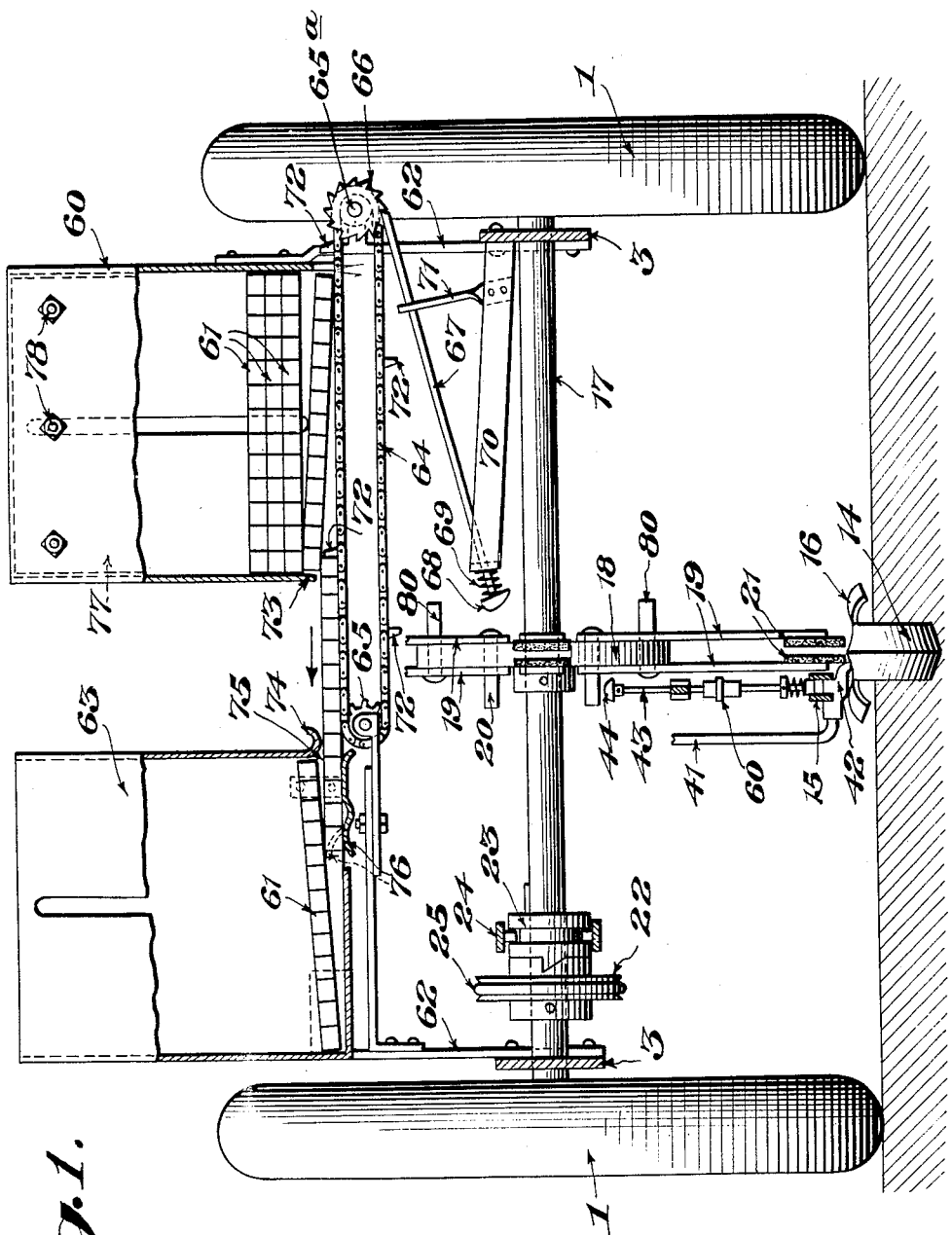

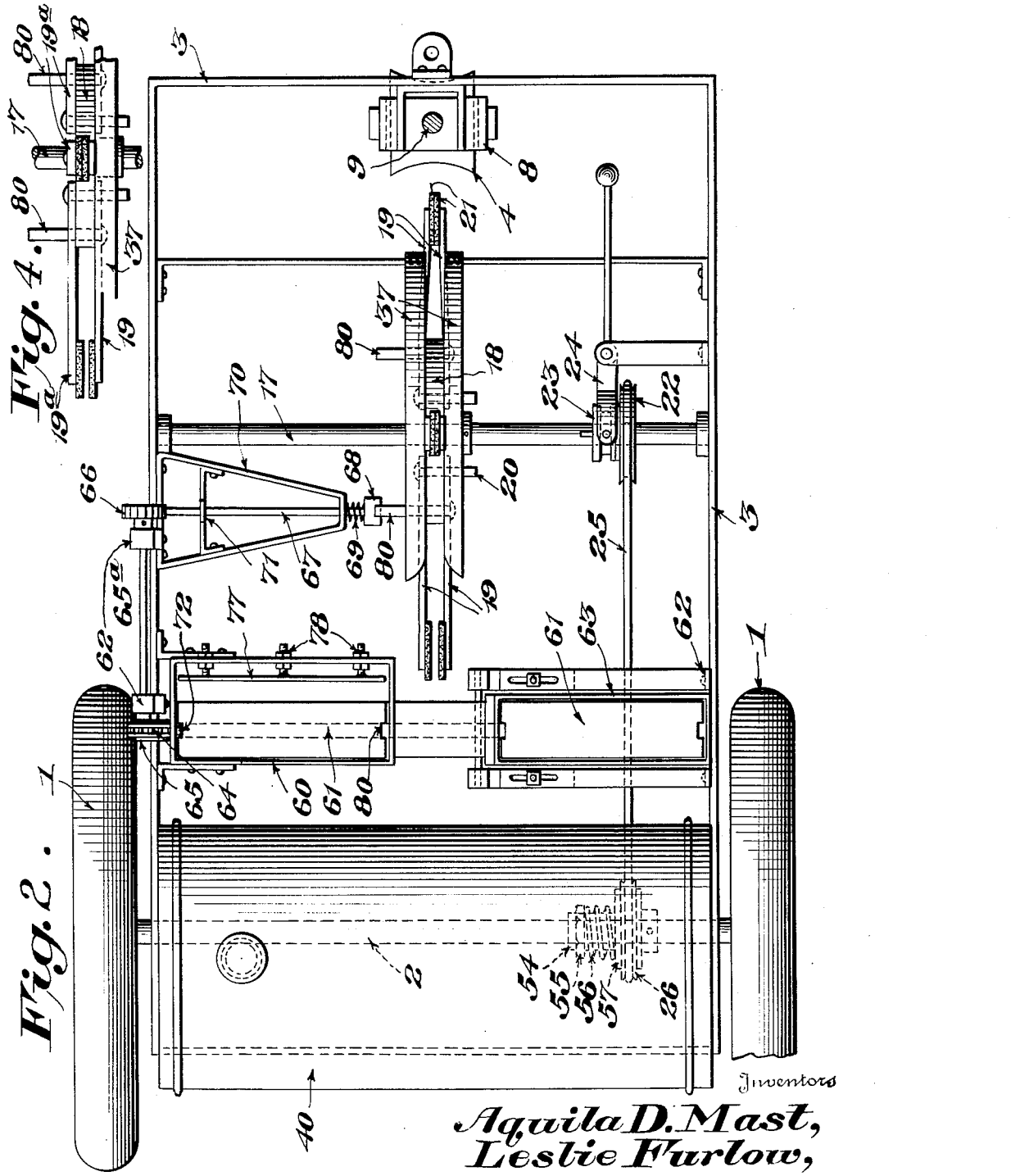

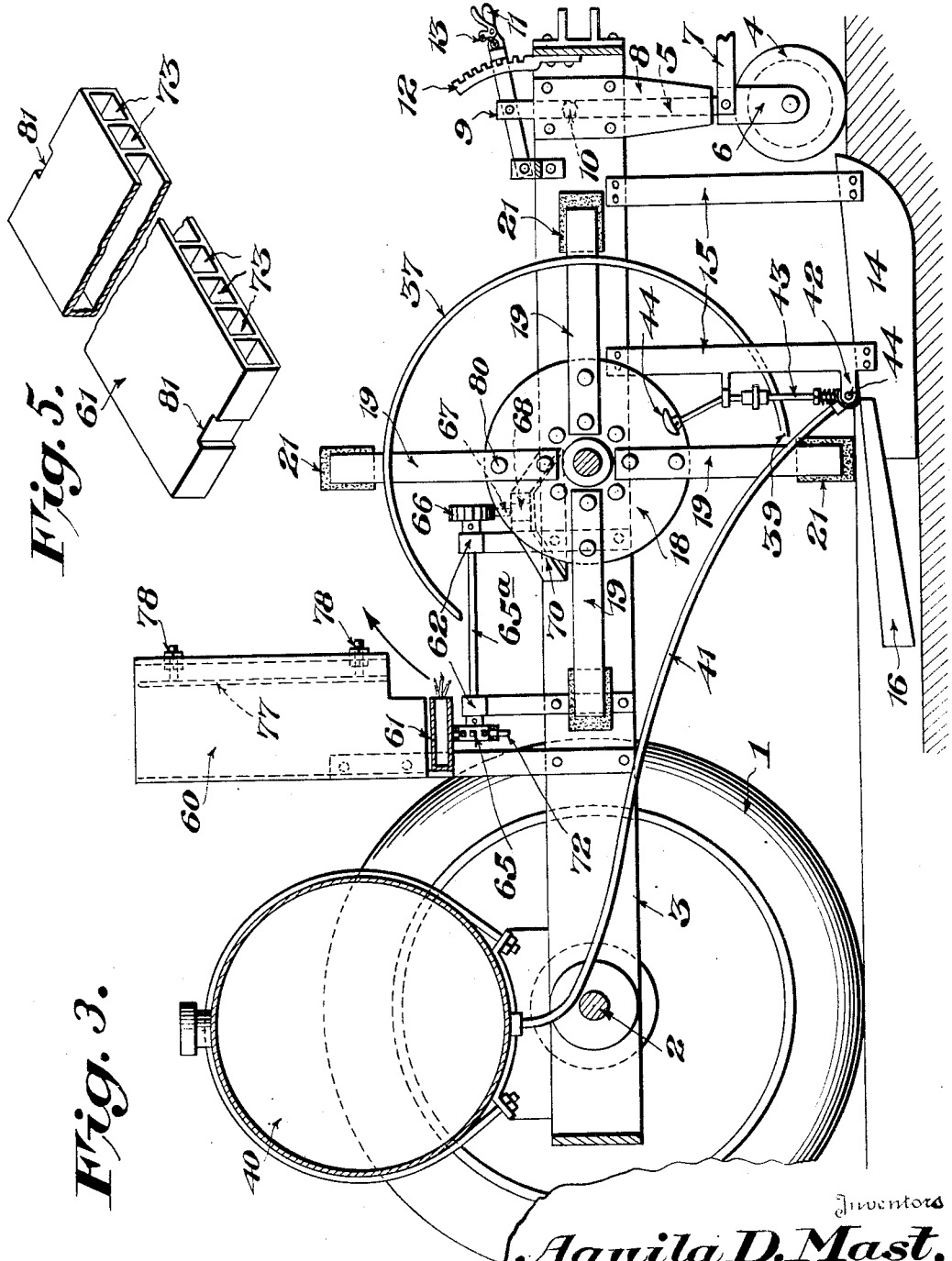

Patented Nov. 9, 1943

2,333,945

UNITED STATES PATENT OFFICE 2,333,945

AUTOMATIC TRANSPLANTER

Aquila D. Mast and Leslie A. Furlow, Lancaster, Pa.

Application April 16, 1942, Serial No. 439,260

8 Claims. (Cl. 111—3)

The object of our invention is to provide a novel automatic transplanter.

It is also an object of our invention to provide novel means for automatically supplying water to the furrow for each plant as it is deposited in the furrow.

It is also an object of our invention to provide novel means for grasping the plants without injuring them and moving them into a position to be dropped into the furrow, and automatically releasing them at the desired time.

It is also our object to provide a novel combination and arrangement of mechanism as disclosed in the accompanying drawings, for automatically controlling the operation of the transplanting.

It is also an object of our invention to provide large boxes or containers in one of which cartons carrying the plants are placed and from which the individual cartons are conveyed to the transplanting mechanism and the empty cartons delivered to the large empty box or container.

It is also an object of our invention to provide a modified form of the plant engaging mechanism.

We attain these and other objects of our invention by the mechanism illustrated in the accompanying drawings, in which—

Fig. 1 is a vertical section partly in elevation of our machine;

Fig. 2 is a top plan of the machine shown in Fig. 2.

Fig. 3 is a longitudinal section of the invention shown in Figs. 1 and 2;

Fig. 4 is a detail view of the plant engaging mechanism; and

Fig. 5 is a detail perspective view of the individual plant containing cartons.

Like numerals of reference designate like parts throughout the several views.

Figure 6:
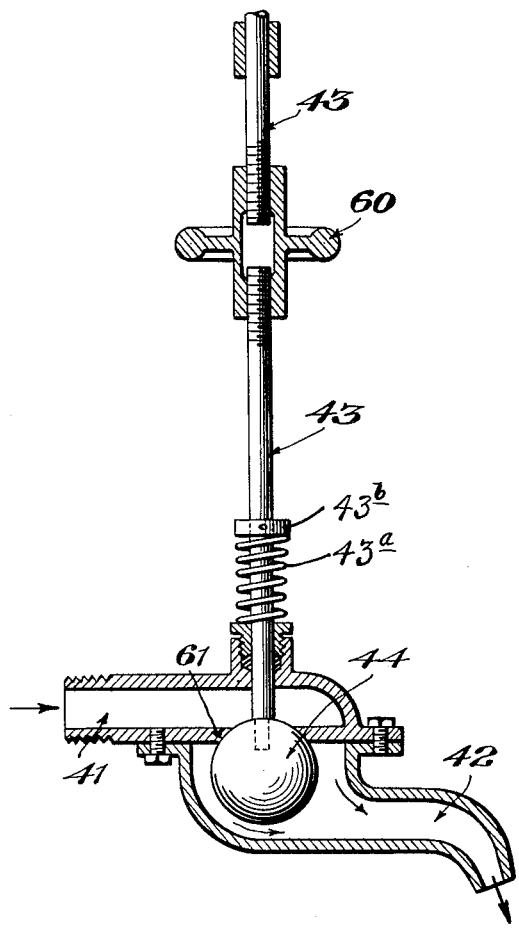
Fig. 6 is a detail view partly in section and partly in elevation of the water valve.

Referring to the accompanying drawings, main wheels 1 are mounted on the shaft 2 which supports the rear end of the frame 3. The front end of the frame is supported by the steering post 5, steering bracket 6 and suitable rollers or roller 4. A hinged hitch 7 attached to bracket 6 operatively connects the machine to a suitable tractor or other motive power. The bracket 8 carries the steering post 5 and aligned adjusting post 9, with a ball bearing 10 interposed between posts 9 and 5 to permit free turning of steering post 5. A hand lever 11 is pivotally attached to the upper end of adjusting post 9 and adjustably engages the ratch segment 12 by means of hand-operated latch 13.

We provide a furrow forming shoe 14 affixed to the frame 3 by means of suitable braces 15. Attached to the rear portion of the shoe 14 are spaced press plates 16 preferably curved in cross section, to press the earth in place around the transplanted plants.

Mounted in the forward portion of the frame 3 and disposed above the shoe 14 is a shaft 17 carrying the transplanter disk 18 to which are affixed a suitable number of pairs of transplanter arms 19 secured to the disk by bolts 20 which project out beyond the arms and also function as trip elements. Each pair of arms carry a pair of soft plant-engaging pads on their free end to carry the plants from the transplanter to the furrow, as shown in Fig. 2 and driven pulley 22 is affixed to transplanter shaft 17. A clutch 23 operated by lever 24 is provided adjacent pulley 22 for throwing same into or out of operation.

Pulley 22 is operatively connected by belt 25 with the driving pulley 26 on main shaft 2. Pulley 26 is provided with a suitable clutch 27 such as the friction clutch, which is shown in detail in Fig. 7.

We provide novel spaced transplanter guide strips 37 of arcuate shape, as shown, which retain the transplanter arms 19 in proper position to hold the plants between the pads 21 of each pair of arms.

The beveled receiving ends of guide strips 37 are designated 38. 39 designates the discharge end of said guide strips.

Referring to Figs. 2 and 3 of the drawings, we provide a suitable water tank 40 having a water discharge pipe 41, terminating in a spout 42 positioned to discharge water into the furrow. A spring-controlled trip valve lever 43 operates the valve 44, controlling the passage of water from pipe 41 to spout 42. Trip valve lever 43 has a knob 43' on its upper end which is engaged successively by the trip bolts 20 to open the valve 44 at the appropriate time. The trip valve lever 43 is made in two sections connected by a manually operable turnbuckle 60 to permit convenient adjustment of the trip valve lever.

Figure 7:
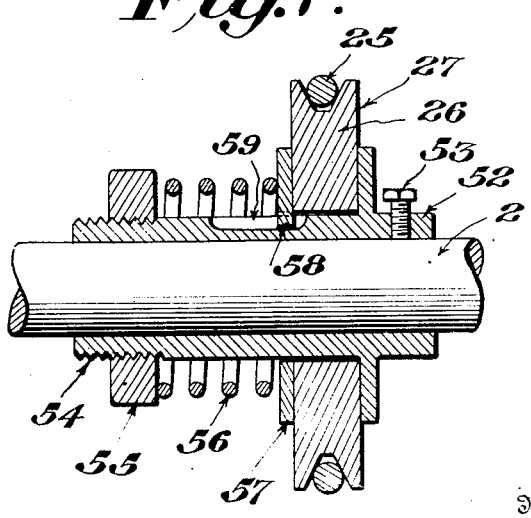
Fig. 7 is a detail sectional view of the friction clutch.

Referring to Fig. 7, the friction clutch 27 of pulley 26 consists of sleeve 52 on which pulley 26 is loosely mounted. The sleeve 52 is affixed to the shaft 2 by bolt 53. Sleeve 52 has a threaded end 54 on which nut 55 is mounted. A spring 56 is interposed between nut 55 and washer 57, which in turn frictionally engages the pulley 26. Washer 57 has a key 58 slidable in the key slot or groove 59 of sleeve 52.

Any suitable number of the transplanting arms 19 are mounted on the transplanter disk 18, which is mounted on the transplanter shaft 17. Shaft 17 is driven by belt and pulley from the main driving shaft 2, as shown in Fig. 2. As the transplanter arms enter the channel between the inwardly tapered ends 38 of the transplanter guide strips 37, they are brought into sufficient proximity to grasp the head of the plant and pull it from its compartment and swing it in a circle, as indicated by the arrow in Fig. 3, until the transplanter arms are allowed to spring into their normal spaced relation when they reach the outwardly tapered ends 39 of the spaced guide strips 37 and thereupon deposit the plant in the furrow which has been formed by the shoe 14. The earth is thereupon pressed around the plants by the press plate 16.

The roller 4 at the front of the machine is a concave roller which breaks up clods and prepares the ground for the operation of shoe 14. If desired a pair of wheels set at an acute angle to each other may be used instead of the concave roller 4.

The depth of the furrow may be regulated by adjusting the height of the concave roller 4 relative to the V-shaped shoe 14 by operating the hand lever 13 to raise or lower the steering post 5 on which the roller 4 is mounted.

The number of trip bolts and transplanter arms may be varied according to whether it is desired to insert the plants close together or far apart in the furrow. As each plant is placed in the furrow, one of the trip bolts engages the knob 43' of the water valve lever 43, thereby depressing the valve 44 (see Fig. 6) and allowing the water to flow through pipe 41 into spout 42, thence to the furrow.

As shown in Fig. 1, we provide a large box or container 60 at one side of the machine in which a series of plant containing cartons 61 are placed, one on top of the other. This box is supported by bracket 62 affixed to the frame 3. On the opposite side of the machine we provide a similar large box or container 63 to receive the empty plant containing cartons after the plants have been withdrawn from the cartons by the transplanting mechanism heretofore described. This box is supported by a similar bracket 62. Positioned under the box 60 and spaced from the lower end of that box is an endless conveyor 64 mounted on sprockets 65. On the shaft 65ª of outer sprocket 65 there is also mounted a ratchet 66 which is intermittently operated by a push rod 67 which has a shoe 68 on its end and a spring 69 interposed between said shoe and the bracket 70 which with the auxiliary bracket 71 supports the push rod 67 while permitting free movement of that rod. The push rod 67 is operated by the adjustment of release trip pins 80 on the plant wheel or disk 18, which as that disk or wheel is rotated contact with shoe 68 and push the shoe 68 causing the push rod 67 to actuate the ratchet 66 and thus turn the sprocket 65 which is mounted on the same shaft 65ª and this moves the conveyor belt 64, the fingers 72 of which would engage the lowermost plant containing carton 61 in box 60 and move it from the full box to a position where the transplanting mechanism can grasp the first plant in the individual compartment 73 in the carton 61. Intermittently the conveyor chain 64, driven by the sprocket 65 operated by ratchet 66 will move the carton 61 into position so that successive plants may be withdrawn from the carton which is pushed under the rounded end 74 above the aperture 75 at the adjacent side of the empty large box or container 63. This empty box 63 has a flat spring 76 mounted on its bottom and of sufficient strength to raise the end of the bottom carton slightly above the level of the curved edge portion 74 above the aperture 75 so that the carton at that side of the box 63 will be raised sufficiently to permit of the succeeding carton being pushed in under it. A similar operation occurs with the entry of each additional box.

The cartons in the filled large box or container 60 are moved downwardly by gravity in succession into a position to be engaged by the spaced projecting fingers 72 of the conveyor chain 64.

The sponge rubber or other soft grasping fingers 21 remove the plants from the individual compartment 73 in the plant containing carton 61.

The spring 76 in the empty container or box 63 into which the empty cartons are moved, is held in contracted position by the weight of the box and the pressure of the guide member 74 on the bottom edge of the container as the carton 61 passes into the container 63, but when the carton is all the way in, the spring 76 will push the rearward end of the carton upwardly to permit entry of the next carton under it, as shown in Fig. 1.

As shown in Fig. 3, the boxes 60 and 63 have an adjustable wall 77, the adjustment of which can be regulated by the bolts 78 to enlarge or contract the size of the box for holding plants of different length, as may be desired. This box wall 77 does not engage the individual cartons 61 but is in contact only with the heads of the plants which project out from the cartons. One of the sprockets 65, preferably the one nearest the large box or container 63, is adjustably mounted so that it can be adjusted to keep the conveyor chain taut.

In operation, the release trip pin 80 comes in contact with the shoe 68 of push rod 67 to operate it and the push rod in turn operates the ratchet 66, which actuates the sprocket 65 and moves the conveyor chain the distance of one compartment 73 of the bottom individual carton 61. This intermittent operation of the conveyor chain moves the carton so that with each operation a pair of transplanting arms will engage one plant and withdraw it from the carton 61. The carton 61, as shown in Fig. 5 has recesses 81 at its ends to accommodate fingers 72 of the conveyor chain 64 and prevent any possibility of slipping when these fingers engage the carton.

As shown in Fig. 4, we may provide a modification of the plant engaging mechanism in which one of the transplanter arms 19ª is a rigid arm while the other arm 19 is a flexible arm which is guided as by a guide strip 37, which causes the arm 19 to move toward and away from the rigid arm 19ª as the planting wheel or disk 18 revolves. This construction eliminates one of the members 37 of the original form of the invention.

We provide a spring 43ª engaging a collar 43ᵇ affixed to trip valve lever 43 to normally hold the valve 44 in closed position until it is positively operated at predetermined intervals, controlled by the bolts or fingers 20, as shown in the drawings.

All plants will be set in the ground at an identical depth. The timing is so arranged that all plants are deposited in the area containing the maximum amount of moisture. In other words, it will be impossible to drop the plants before or after the water is released, which often occurs where men are used to manually drop the plants in the furrow.

The machine is intended for transplanting small plants, such as various flowers, tobacco, cabbage, tomatoes, and other plants.

The mechanism of the machine may be duplicated on the frame for operating on more than one row, if desired, with suitable mechanism for adjusting the distance between the rows.

A suitable or conventional marker one on each side of the planter may be provided as a guide for the operator, such a device being conventional in agricultural machines.

The large boxes for holding the plant carrying cartons, and also the cartons themselves may be made of any suitable material, such as metal, plastic, wood, or the like.

What we claim is:

1. In a transplanting machine, the combination of a wheeled frame, a driven shaft, a plurality of pairs of spaced transplanter arms, a rotatable member mounted on the shaft and carrying said arms, soft pads mounted on the free ends of said arms to grasp the plants, large boxes mounted in spaced relation on opposite sides of the machine, a series of plant containing cartons adapted to be placed in one of the boxes, conveyor means for moving the lowermost carton into position for the transplanter arms to withdraw successive plants, and means for thereafter moving the cartons successively into the bottom of the large box arranged to receive the cartons after the plants have been removed therefrom.

2. In a transplanting machine, the combination of a wheeled frame, a driven shaft, a plurality of pairs of spaced transplanter arms, a transplanter arm carrying member mounted on the shaft, soft pads on the free ends of said arms to grasp the plants, a series of plant containing cartons, each containing a plurality of plant receiving compartments, conveying means for moving the lowermost carton from one box to the other box and into position for the transplanter arms to withdraw successive plants while the carton is being thus conveyed, and means for causing the transplanter arms to close and engage the plants and release them again successively when they have been brought into a position for depositing in a furrow.

3. In a transplanting machine, the combination of a wheeled frame, a driven shaft, a plurality of pairs of spaced transplanter arms, a rotatable member carrying said transplanter arms mounted on the shaft, soft pads mounted on the free ends of said arms, a pair of opposite boxes mounted on the machine, a plant-carrying conveyor, cartons having a plurality of compartments and seated one above the other in one of the boxes and movable by the aforesaid conveyor to the other box after the plants have been removed successively by the transplanter arms from the successive compartments of each carton, means for causing the transplanter arms to grasp the plants successively and deposit them in a furrow at a uniform depth.

4. In combination with the mechanism defined in claim 3, a V-shaped shoe for forming a furrow to receive the plants to be transplanted, and spaced press plates for pressing the earth around the plants after they have been deposited in the furrow.

5. In a transplanting machine, the combination of a wheeled frame, a driven shaft, a plurality of pairs of spaced transplanter arms, a member carrying said arms said member being mounted on said driven shaft, soft pads mounted on the free ends of said arms, boxes mounted in spaced relation on opposite sides of the machine, a series of plant containing cartons, each containing a plurality of compartments one for each plant, said cartons being of suitable size to be positioned one over the other in one of the boxes, a conveyor having fingers adapted to engage the lowermost carton and move it successively into position for the transplanter arms to engage the plants in succession and deposit them in the furrow and thereafter to move the carton into the bottom of the other empty box one carton under the other, means for causing the transplanter arms to grasp successive plants and deposit them in the furrow at a uniform depth, a V-shaped shoe for forming a furrow to receive the plants to be transplanted, and spaced press plates for pressing the earth around the plants after they have been deposited in the furrow, and means for intermittently discharging water into the furrow for each plant transplanted.

6. In a transplanting machine, the combination of a wheeled frame, a driven shaft, a plurality of pairs of spaced flexible transplanter arms actuated by said shaft, soft pads on the free ends of said arms, a pair of boxes mounted in spaced relation on opposite sides of the machine and adapted to hold a considerable number of plant containing cartons, a series of cartons having a series of compartments each adapted to hold one plant, conveyor means for moving the lowermost carton into a position in which successive plants may be grasped by the transplanter arms and deposited in the furrow, means for delivering the cartons from one box to the transplanter arms and thence to the other empty box, and means to cause one carton to be inserted under another successively in the empty box, means for causing the transplanter arms to close and grasp the plants successively and to release them at a uniform depth in the furrow, a V-shaped shoe for forming a furrow to receive the plants to be transplanted, spaced press plates for pressing the earth around the plants after they have been deposited in the furrow, and means disposed in advance of the furrow forming shoe to level the ground, and means for manually adjusting the aforesaid means to and from the frame of the machine.

7. In a transplanting machine, the combination of a wheeled frame, a driven shaft, a plurality of pairs of spaced transplanter arms, a transplanter arm carrying member mounted on the shaft and rotating with it, pads on the free ends of said arms, a pair of spaced boxes of suitable size to receive a series of cartons each containing a series of plants with the heads of the plants protruding from the cartons, means for adjusting the sides of one of said boxes to and from the heads of the plants to permit of its accommodating plants of different sizes and kinds, a series of cartons filling one of said boxes, each carton having a series of individual plant containing compartments, means for conveying the lowermost carton in the full box to the transplanter arms and thereafter to the empty box when the plants have been removed from the carton by the transplanter arms, means to cause successive empty cartons to slide under cartons already delivered to the last-mentioned box and to raise one end of the carton to permit the sliding of the next carton under it after the plants have been withdrawn by the transplanter arms, means for causing the transplanter arms to grasp successive plants when conveyed to a position opposite said transplanter arms, means for intermittently actuating said conveying means last mentioned, whereby to move the conveying means the distance that the plants are spaced apart in the carton at predetermined intervals.

8. In a transplanting machine, the combination of a wheeled frame, a driven shaft, a plurality of pairs of spaced transplanter arms, a rotatable element carried by said driven shaft and in turn carrying the transplanter arms, soft pads on the free ends of the said arms, boxes mounted in spaced relation on opposite sides of the machine, a series of plant containing cartons each containing a series of compartments one for each plant, said cartons being placed one over the other in one of the aforesaid boxes, conveyor means for moving the lowermost carton into a position in which successive plants may be grasped by the transplanter arms and deposited in the furrow, means for causing the cartons when emptied to be inserted one under the other at the bottom of the originally empty box, a shoe for forming a furrow to receive the plants to be transplanted, spaced press plates for pressing the earth around the plants after they have been deposited in the furrow, means for intermittently actuating the conveyor belt to move the carton a distance of one plant containing compartment of the carton at a time into position for successive plants to be withdrawn by the transplanter arms, and means for adjusting the size of the boxes to accommodate plants of different sizes.

AQUILA D. MAST.
LESLIE A. FURLOW.